United States Patent [19]
Loper
[11] 3,735,038
[45] May 22, 1973

[54] MEANS FOR SUPERIMPOSING A MARKER SIGNAL ONTO A COMPOSITE VIDEO SIGNAL

[75] Inventor: Ronald Lee Loper, Simi, Calif.
[73] Assignee: RCA Corporation, New York, N.Y.

[22] Filed: Jan. 27, 1972
[21] Appl. No.: 221,243

[52] U.S. Cl.............178/7.3 R, 178/69.5 TV, 315/22, 315/26, 328/189
[51] Int. Cl.............H04n 5/44
[58] Field of Search............178/7.3 R, 69.5 TV; 315/22, 26; 328/189

[56] References Cited

UNITED STATES PATENTS 3,353,035 11/1967 Dent............328/189
3,462,639 8/1969 French............315/22.5
3,567,860 3/1971 Oliver............178/69.5 TV

*Primary Examiner*—Robert L. Richardson
*Assistant Examiner*—Richard Dixon Maxwell
*Attorney*—Edward J. Norton

[57] ABSTRACT

A circuit for generating a marker signal on a video signal at a predetermined point in a stream of composite video signals. Each vertical sync pulse causes a clock pulse to be applied to a first bistable logic circuit. The switched output state of the first circuit starts a first timing circuit which enables a second bistable logic circuit after a first predetermined time period. After being enabled, the second bistable circuit changes state upon application of the next horizontal sync pulse and thereby starts a second timing circuit which resets the first circuit after a predetermined time period. The reset output at the first circuit resets the second circuit and the changing output signal momentarily cuts off an output transistor. The output circuit of the transistor applies a marker signal on the video signal at a point determined by the first and second time periods.

12 Claims, 2 Drawing Figures

MEANS FOR SUPERIMPOSING A MARKER SIGNAL ONTO A COMPOSITE VIDEO SIGNAL

BACKGROUND OF THE INVENTION

The present invention relates to a video marker signal generator and, more particularly, to circuitry for superimposing a marker signal onto a video signal.

In many instances it is desired to provide on a display device of composite video signals, such as the screen of a cathode ray tube (CRT), a marker or cursor signal at a predetermined location with respect to the displayed information. For example, in alpha-numeric display systems which are typically controlled by a computer, a light pen is often used to facilitate entry and removal of the alpha-numeric characters. The light pen provides a marker which enables an operator to locate the screen position at which an entry or removal is to be performed. In other applications, such as moving-map (or other picture information) displays, it is common to use a marker as a pointer. A convenient method for providing the marker in these instances is to superimpose a signal onto the composite video signal before the video information is displayed.

Another useful application is where it is desired to provide an oscilloscope display of the waveforms of a recurrent stream of composite video signals. Here the marker signal is superimposed at a particular point in the stream which then serves as a sync or trigger signal input to the oscilloscope for timing purposes. In this manner an operator may individually display a particular segment, such as one scan line, in the stream of composite video signals.

In the prior art, complex electronic circuits, such as a computer, are utilized to generate and to control the position of marker signals used in the various display applications. For example, counter circuits are used to count signals representative of the vertical and horizontal sync pulses. When the elapsed count agrees with a reference count, a predetermined and prestored output signal is provided to control the display device at the desired location as determined by the reference count. Additionally, complex electro-mechanical devices, such as shaft encoders and encoded discs, are used in concert with the electronic circuits to vary the position of the marker.

In contrast to the prior art, the present invention provides a simple and inexpensive marker generator which may be added to existing display systems by simply coupling the output or the generator to a circuit point which is common to the input signal of the display device.

SUMMARY OF THE INVENTION

Briefly, the present invention provides apparatus for use with a video information signal means employing vertical and horizontal sync signals, for superimposing a marker signal on the video signal having a predetermined relationship to the vertical and horizontal sync signals. The apparatus includes first means for deriving separate signals representative of the vertical and horizontal sync signals. Second means are coupled to the first means and are responsive to the vertical sync signals for producing a first output signal having a predetermined time period. Third means coupled to the first means and the second means are responsive to the horizontal sync signals after being enabled by the first output signals for producing a second output signal having a predetermined time period. An output means which is coupled to one of the second and third means is provided for producing a third output signal in response to one of the output signals. The output means is adapted for coupling to the video information signal means.

DETAILED DESCRIPTION

Figure 1:
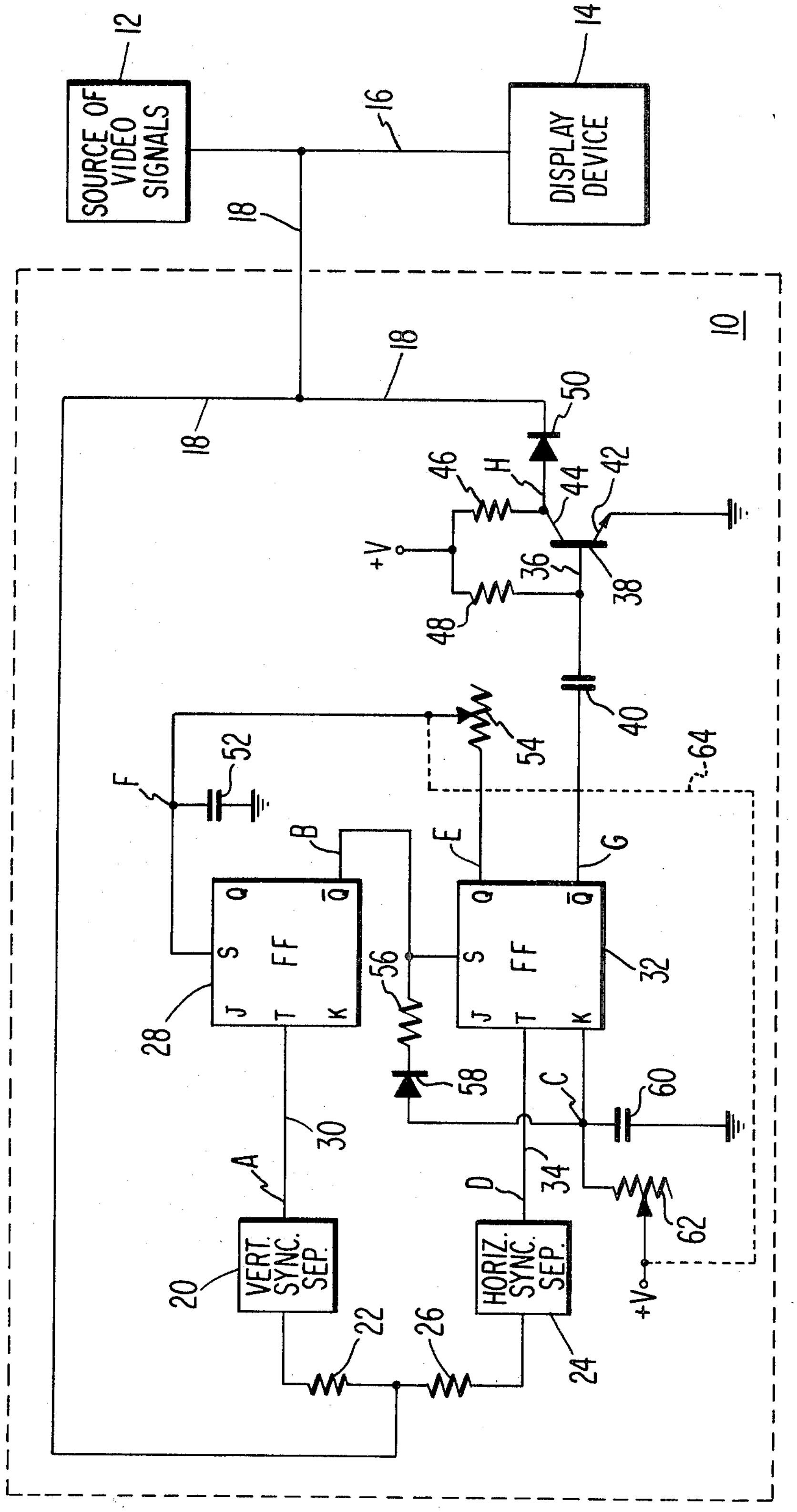
FIG. 1 illustrates a preferred embodiment of the marker generator of the present invention.

Referring now to FIG. 1, there is shown generally at 10 a circuit diagram of the marker generator of the present invention in conjunction with a source of video signals 12 and a display device 14. Source 12 may be a closed-circuit television camera, a video tape recorder operating in the playback mode, or any other source of video signals generating a composite video waveform. The composite waveform includes vertical and horizontal sync pulses associated with the video picture information. Device 14 may be one or more CRT display devices, such as a closed-circuit television monitor; a video tape recorder operating in the record mode with or without a monitor; or any other device receptive of the above-mentioned composite video signals.

Source 12 is coupled to display device 14 by way of lead 16 which may be a coaxial cable. Video signals are applied to lead 16 at the output of the source 12. The video signals are applied to circuit 10 by way of lead 18. The junction formed by leads 16 and 18 may comprise, for example, a coaxial T connection. The video signals on lead 18 are applied to vertical sync pulse separator 20 by way of isolating resistor 22. The video signals are also applied to the input of horizontal sync pulse separator 24 by way of isolating resistor 26. The output of pulse separator 20 is applied to the clock pulse input T of a flip-flop (FF) 28 by way of lead 30. The output of pulse separator 24 is applied to the clock pulse input T of flip-flop (FF) 32 by way of lead 34. The $\overline{Q}$ output of flip-flop 32 is applied to the base electrode 36 of NPN transistor 38 by way of capacitor 40. The emitter electrode 42 of transistor 38 is connected to a point of reference potential such as ground. The collector electrode 44 of transistor 38 is connected by way of resistor 46 to a fixed point of potential such as +V. The base electrode 36 is also coupled to +V by way of resistor 48. The collector electrode 44 is also coupled to lead 16 by way of diode 50.

The Q output of flip-flop 32 is coupled to the junction formed by the set input S of flip-flop 28 and one terminal of capacitor 52 by way of variable resistor 54. The other terminal of capacitor 52 is connected to ground. The $\overline{Q}$ output of flip-flop 28 is connected to the junction formed by the set input S of flip-flop 32 and current limiting resistor 56. The other terminal of resistor 56 is connected to the cathode electrode of diode 58. The anode electrode of diode 58 is connected to the junction formed by the input K of flip-flop 32, capacitor 60 and variable resistor 62. The other terminal of capacitor 60 is connected to ground. The other terminal of variable resistor 62 is connected to +V. Variable resistors 54 and 62 are mechanically coupled to adjustment means 64 which is shown as a dotted line.

As is known, vertical sync pulse separator 20 may comprise any one of a number of sync stripper circuits. Pulse separator 20 may be, for example, a low pass filter-differentiating network circuit. The differentiating network portion of the circuit may be a series capacitor which provides a pulse signal for the leading edge of the vertical sync pulse and a pulse signal representing the trailing edge of the vertical sync pulse. A simple diode may be used to clip the undesired pulse of the resulting pulse pairs for each vertical sync pulse. Preferably, pulse separator 20 includes a low pass filter preceding the differentiating network in order to block the higher frequency video information. Similarily, pulse separator 24 may include a low pass filter followed by a differentiating network. The time constants of the two differentiating networks may be selected so as to enhance the separation of their respective sync pulses. Sync separators 20 and 24 may also include one or more active stages such as a transistor-inverter stage. The advantage of an active stage is that the output signals from the sync separators will thereby exhibit a sharper waveform. Finally, both the vertical and horizontal sync pulses may be derived from a sync separator as is known in the art.

The embodiment of the invention will be described in terms of a positive logic system where the logic levels used for the circuit are logic "0" to indicate ground potential and a logic "1" to indicate a relatively positive voltage which may be, for example +V.

The bistable multivibrators, flip-flops 28 and 32, as shown in FIG. 1, include J, K, S, and T inputs, and Q and $\bar{Q}$ outputs. The S input is used to preset the Q and $\bar{Q}$ outputs such as to establish initial conditions. A ground potential or logic 0 applied to the S input sets the Q output to a logic 1 and the $\bar{Q}$ output to a logic 0. With a logic 1 applied to the J and K inputs the flip-flop will toggle, causing the Q and $\bar{Q}$ outputs to change state, when a negative going signal such as the negative going edge of a clock pulse is applied to the clock pulse, or T, input. If, however, the J or K inputs are held at a ground or logic 0 potential, the clock pulse input T is disabled and the flip-flop will not toggle. If either the J or K input is left open, or unconnected, this has the same effect as applying a logic 1 to that input. Further, the logic 1 potential applied to, for example, the K input of flip-flop 32 need not be at full battery or +V potential in order to enable the clock pulse input To Instead the logic 1 potential is effected at an intermediate and relatively positive potential between ground and +V. This intermediate potential is referred to as the threshold level. Similarly, there exists a threshold level, which is an intermediate potential between +V and ground, and which when applied to the preset input S of the flip-flop will set the Q output to a logic 1 and the $\bar{Q}$ output to a logic 0.

Figure 2:
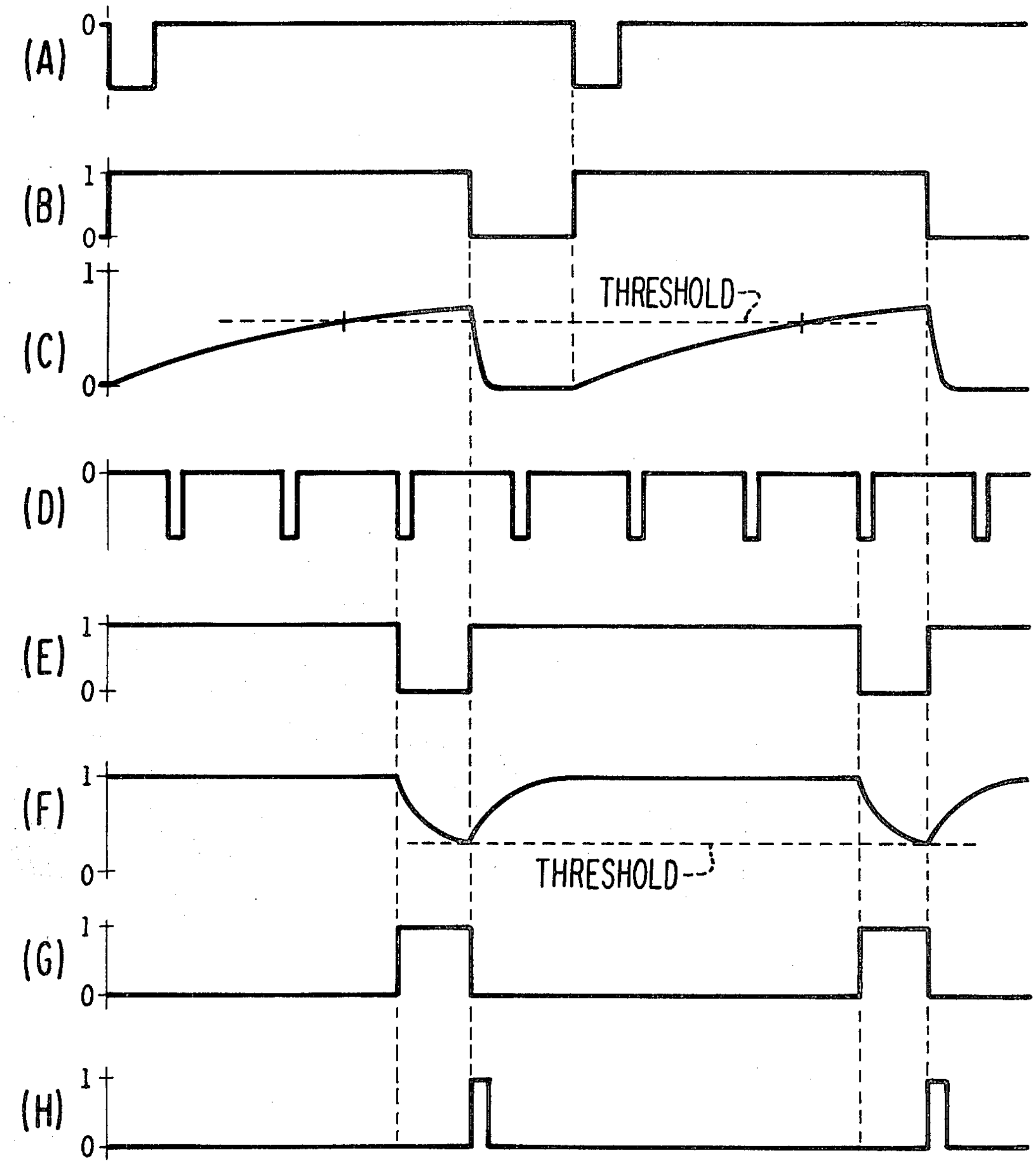
FIG. 2 is a timing diagram illustrating the signal waveforms associated with the operation of the marker generator shown in FIG. 1.

The operation of marker generator 10 will be more clearly understood by reference to the waveforms of FIG. 2. For clarity, the vertical and horizontal sync pulses derived from sync separators 20 and 24, designated as A and D respectively in FIG. 2, are not shown on a conventional time scale relative to each other. That is, a conventional composite video signal would exhibit a greater number of horizontal sync pulses between successive vertical sync pulses.

Assuming initially that the Q outputs of flip-flops 28 and 32 are logic 1's representing a set flip-flop condition, the operation of marker generator 10 is as follows. The first vertical sync pulse at A which is applied to the clock pulse input T of flop-flop 28, toggles flip-flop 28 causing its Q and $\bar{Q}$ outputs to change state. The $\bar{Q}$ output of flip-flop 28 at B which was a logic 0 prior to the application of the vertical sync pulse is now a logic 1. The logic 1 at B back-biases diode 58 thereby permitting capacitor 60 to charge through variable resistor 62. When the rising voltage at C reaches the threshold level at the K input of flip-flop 32, the clock input T of flip-flop 32 will be enabled. Thereafter, the next horizontal sync pulse at D toggles flip-flop 32 causing its Q and $\bar{Q}$ outputs at E and G to change state. The Q output of flip-flop 32 at E will now be a logic 0, and capacitor 52 which was initially charged to a logic 1 level will now discharge through variable resistor 54. When the decreasing voltage at F falls to the threshold level of the preset input S, flip-flop 28 will be reset to its initial condition. When this occurs, the logic 0 at the $\bar{Q}$ output of flip-flop 28 at B will reset flip-flop 32 back to its initial condition. The negative going or trailing edge of the output waveform at the $\bar{Q}$ output of flip-flop 32 is applied to the base electrode 36 of normally conducting transistor 38 through differentiating capacitor 40. The resulting negative going transition at the base electrode 38 of transistor 38 will momentarily turn off NPN transistor 38. Accordingly, a momentary positive going pulse of amplitude +V and having a pulse width determined by the value of capacitor 40 will appear at the collector 44 of transistor 38.

The positive going pulse at H forward biases diode 50 and therefore appears on lead 16. Prior to this pulse diode 50 was back-biased by the substantially zero voltage potential present at the collector 44 of conducting transistor 38. It should be apparent that since diode 50 is normally back-biased, transistor 38 does not present a load to line 16 when transistor 38 is conducting.

When flip-flops 28 and 32 are returned to their initial condition, capacitor 60 is discharged to a logic 0 potential through diode 58 and current limiting resistor 56; and capacitor 52 is rapidly charged to a logic 1 potential through resistor 54.

It can be seen then that a time interval or period exists between each vertical sync pulse and the first horizontal sync pulse thereafter in which the flip-flop 32 can be toggled, as determined by the RC time constant of variable resistor 62 and capacitor 60. Similarly, it can be seen that a time period exists between the toggling of flip-flop 32 and the occurance of an output signal at the output of transistor 38, as determined by the RC time constant of variable resistor 54 and capacitor 52. It follows then that the vertical position of the marker signal generated as may be observed at display device 16 can be adjusted to a predetermined position by adjusting variable resistor 62. Likewise, the horizontal position of the marker pulse as observed at display device 16 can be adjusted to a predetermined position by adjusting variable resistor 54. It should be apparent that the starting point of each of these time periods is precisely determined by the vertical and horizontal sync pulses of the composite video signal itself. Further, the termination of these periods can be readily adjusted by variable resistors 54 and 62. Thus, the output of marker generator 10 is precisely synchronzied to the information content of the video signal.

To facilitate operator control of marker generator 10, variable resistors 54 and 62 may be ganged together on a single control. For example, adjustment means 64 may comprise a unitary control having two degrees of freedom such as a "joy-stick". A joy-stick, in this context, is a variable resistance device having two independent outputs. The first output provides a resistance which varies solely in accordance with the position of the joy-stick in a plane representing the first degree of freedom. Similarly, the second output provides a resistance which varies solely in accordance with the position of the joy-stick in a plane representing the second degree of freedom. Thus, the time periods which determine the output signal position of marker generator 10 can be controlled by positioning the joy-stick to the corresponding position within each degree of freedom.

As discussed above, the pulse width of the output pulse at the collector of transistor 38 varies according to the value of differentiating capacitor 40. It has been found that the horizontal width of the marker signal as displayed on a CRT screen can be varied between a virtual point and a horizontal line extending across approximately 10 per cent of the screen width. The corresponding values of capacitor 40 being 500 pfd. and 2,000 pfd. respectively.

The embodiment of the present invention, as shown in FIG. 1, provides a positive going output pulse. When this output pulse is superimposed onto the picture signal information of a composite video signal, a blacker than black marker signal results if the source of the composite video signal uses the standard negative polarity transmission. If the source uses positive polarity transmission, the marker signal will appear whiter than white. It should be obvious, however, that the marker generator can provide a negative going output pulse. For example, by biasing transistor 38 normally off, reversing the polarity of diode 50, and coupling capacitor 40 to the Q output of flip-flop 32, a negative going output pulse can thereby be provided. It should be noted that both the Q and $\bar{Q}$ outputs of either flip-flop can provide a suitable input to output transistor 38.

Referring again to FIG. 1, it should be noted that the input to sync separators 20 and 24, and the output of transistor 38 are coupled to a common circuit point. This has the advantage that the marker generator 10 can be coupled into a display device system at a single circuit point such as the input of the display device. The isolating resistors 22 and 26 provide isolation between the marker generator and the display device so as to minimize circuit loading at the point of connection. If however, the display system utilizes separate sources for the sync signals and the video picture information signal, a separate connection to each source would be required, unless, of course, the signals are ultimately combined at an available common circuit point within the display device.

The flip-flops 28 and 32 are preferably of the type whose operation depends only on voltage levels, so that the rise and fall times of the input signals are unimportant in determining the state of the flip-flop. This type of flip-flop provides greater flexibility in the design of the RC time constant circuits as well as the sync separators in that the rise and fall times of their output waveforms are relatively unimportant.

By way of example in one instance the circuit of FIG. 1 was constructed as follows: The flip-flops 28 and 32 were a single Motorola MC853 flip-flop which is a monolithic integrated circuit chip consisting of two flip-flops. Transistor 38 was a type known by manufacturer's specification as type 2N3904. The diodes 50 and 58 were of a type known by manufacturer's specification as type 1N914. The various resistors had values as follows: Resistors 22 and 26 were 2.2K ohms; Resistor 46 was 220 ohms; Resistor 48 was 1.2K ohms; Resistor 54 was 5K ohms; Resistor 56 was 10 ohms; and Resistor 62 was 50K ohms. The capacitors had values as follows: Capacitor 40 was 500 to 2,000 pfd. as discussed above; Capacitor 52 was 0.01 mfd; and Capacitor 60 was 10 mfd.

The marker signal cited above by way of example gave good results in a conventional composite signal—CRT display system with a marker signal which varied in width between a virtual dot and a horizontal line as determined by the value of capacitor 40.

What has been taught then is a simple and inexpensive means for superimposing a marker signal onto a video signal of the type employing sync pulses for sychronizing the scanning of a display means to the signal information of the source of the video signals. It will be evident that the present invention as previously described, can be used whenever it is desirable to identify a particular point in a recurrent stream of video signals. Particularly, the present invention can be used in conventional applications such as a light pen or pointer for CRT display devices.

What is claimed is:

1. Apparatus for use with a video information signal means employing vertical and horizontal sync signals, for superimposing a marker signal on the video signal having a predetermined relationship to the vertical and horizontal sync signals, comprising, in combination:

first means for deriving separate signals representative of said vertical and horizontal sync signals;

second means coupled to said first means and responsive to said vertical sync signals for producing a first output signal having a predetermined time period;

third means coupled to said first and second means and responsive to said horizontal sync signals upon being enabled by said first output signals for producing a second output signal having a predetermined time period; and output means coupled to one of said second and third means for providing a third output signal in response to one of said first and second output signals, said output means being adapted for coupling to said video information signal means.

2. The apparatus according to claim 1 wherein said second and third means each include means for adjusting their respective predetermined time periods.

3. The apparatus according to claim 1 wherein said first means includes at least one sync separator for producing vertical and horizontal sync pulses.

4. The apparatus according to claim 3 wherein said second and third means each comprise a bistable multivibrator and said output means comprises an output circuit coupled to one of said bistable multivibrators, said bistable multivibrators being set to a first state in response to said sync signals and being reset to their initial state in response to a reset signal provided by said second output signal, wherein said output circuit provides said third signal in response to said reset signal.

5. The apparatus according to claim 4 wherein said second and third means each include RC time constant circuits, said RC time constant circuits controlling said predetermined time periods.

6. The apparatus according to claim 5 wherein said third output signal is a pulse signal having a pulse width determined by pulse width control means coupled to said output means.

7. Apparatus for use with a video information signal means employing vertical and horizontal sync signals, for superimposing a marker signal on the video signal having a predetermined relationship to the vertical and horizontal sync signals, comprising, in combination:

first means for deriving separate signals representative of said vertical and horizontal sync signals;

a first flip-flop having a clock pulse input, a set input and an output terminal, said clock pulse input being coupled to said first means and being responsive to said vertical signals for changing the output state of said first flip-flop;

a second flip-flop having a clock pulse input, a set input, an output terminal and an enable input, said clock pulse input being coupled to said first means and being responsive to said horizontal signals, after being enabled at said enable input, for changing the output state of said second flip-flop;

first time period means coupled to said output terminal of said first flip-flop and to said enable input and said set input of said second flip-flop for enabling said second flip-flop in response to said vertical sync signal after a predetermined time period;

second time period means coupled to said output terminal of said second flip-flop and to said set input of said first flip-flop for resetting said first flip-flop to its initial state after a predetermined time period; and output means coupled to one of said first and second flip-flops for providing an output signal in response to the changing output of said one of said flip-flops, said output means being adapted for coupling to said video information signal means.

8. The apparatus according to claim 7 wherein said first and second time period means each comprise an RC time constant circuit.

9. The apparatus according to claim 8 wherein said RC time constant circuits each include an adjustable resistance means.

10. The apparatus according to claim 9 wherein said adjustable resistance means comprise a unitary control means having at least two degrees of freedom and two independent resistance outputs, the first output providing a resistance which varies solely in accordance with the position of said control in a plane representing the first degree of freedom and the second output providing a resistance which varies solely in accordance with the position of said control in a plane representing the second degree of freedom, wherein said time periods are controlled by positioning said control within each degree of freedom.

11. The apparatus according to claim 9 wherein said output means for providing a pulse output signal, comprising:

an output transistor having two main electrodes and a control electrode, said main electrodes being adapted for coupling between a substantially fixed point of potential with respect to a point of reference potential and said point of reference potential;

an output pulse width control means having first and second terminals, said first terminal being coupled to said one of said flip-flops, said second terminal being coupled to said control electrode; and means for coupling one of said main electrodes to said video information signal means.

12. The invention according to claim 11 wherein said output pulse width controls means is a capacitor, wherein the value of said capacitor determines the pulse width of said pulse output signal.

* * * * *